(12) United States Patent
Schmidt

(10) Patent No.: US 10,204,446 B2
(45) Date of Patent: *Feb. 12, 2019

(54) ADAPTIVELY ZIPPERING MESHES

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 13/893,194

(22) Filed: May 13, 2013

(65) Prior Publication Data
US 2013/0300734 A1    Nov. 14, 2013

Related U.S. Application Data

(60) Provisional application No. 61/646,603, filed on May 14, 2012.

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01)

(58) Field of Classification Search
CPC ................................ G06T 17/20; G06T 19/20
See application file for complete search history.

(56) References Cited

U.S. PATENT DOCUMENTS

| 5,886,702 | A | 3/1999 | Migdal et al. |
| 6,169,549 | B1 | 1/2001 | Burr |
| 6,693,631 | B2 | 2/2004 | Hubeli et al. |
| 7,228,191 | B2 | 6/2007 | Hofmeister et al. |
| 2006/0290693 | A1 | 12/2006 | Zhou et al. |
| 2006/0290695 | A1 | 12/2006 | Salomie |
| 2007/0165025 | A1 | 7/2007 | Shen et al. |
| 2009/0177454 | A1 | 7/2009 | Bronstein |
| 2010/0226589 | A1* | 9/2010 | Mukherjee ............ G06T 17/205 382/264 |
| 2011/0050691 | A1* | 3/2011 | Hamedi et al. ................ 345/420 |
| 2012/0120074 | A1 | 5/2012 | Huysmans et al. |

(Continued)

OTHER PUBLICATIONS

Turk et al., Zippered Polygon Meshes from Range Images, 1994, SIGGRAPH '94, Jul. 24-29, ACM 1994 ISBN: 0-89791-667-0, p. 1-8.*

Rocchini et al., The Marching Intersections algorithm for merging range images, 2004, The Visual Computer (2004), p. 20:149-164.*

(Continued)

*Primary Examiner* — Samantha (Yuehan) Wang
(74) *Attorney, Agent, or Firm* — Artegis Law Group, LLP

(57) ABSTRACT

One embodiment of the present invention sets forth a technique for zippering meshes of primitives. The technique involves identifying a first vertex associated with a first mesh boundary and having a first position and identifying a second vertex that is proximate to the first vertex and associated with a second mesh boundary, where the second vertex has a second position. The technique further involves determining a third position based on the first position, the second position, and a zippering strength factor, where the third position is located in a region between the first position and the second position. Finally, the technique involves moving the first vertex to the third position.

24 Claims, 12 Drawing Sheets
(6 of 12 Drawing Sheet(s) Filed in Color)

(56) References Cited

U.S. PATENT DOCUMENTS

2012/0215510 A1    8/2012    Metaxas

OTHER PUBLICATIONS

Brochu et al, "Efficient Geometrically Exact Continuous Collison Detection", ACM Transactions on Graphics (TOG), vol. 31 No. 4, dated Jul. 1, 2012, New York, US.

Menci et al. Improved Laplacian Smoothing of Noisy Surface Meshes, 1999, Eurographics, vol. 18 (1999), No. 3, pp. 1-8.

Non-Final Office Action for U.S. Appl. No. 13/893,198, dated Sep. 28, 2016, 20 pages.

Non-Final Office Action for U.S. Appl. No. 13/893,191, dated Jul. 7, 2015, 39 pages.

Non-Final Office Action for U.S. Appl. No. 13/893,198, dated Jul. 29, 2015, 20 pages.

Non-Final Office Action for U.S. Appl. No. 13/893,196, dated Jul. 28, 2015, 16 pages.

Sharf et al., SnapPaste: An Interactive Technique for easy Mesh Composition, Aug. 25, 2006, Visual Comput (2006) 22:835-844.

Non-Final Office Action for U.S. Appl. No. 13/892,750, dated May 4, 2015, 17 pages.

Non-Final Office Action for U.S. Appl. No. 13/892,750, dated Sep. 6, 2016, 19 pages.

Final Office Action for U.S. Appl. No. 13/893,198, dated Dec. 30, 2015, 20 pages.

Andre, Lecture 7—Meshing, 2006, Fluent Inc., p. 1-35.

Bloomenthal et al., Polygonization of Non-Manifold Implicit Surfaces, 1995, SIGGRAPH '95 Proceeding of the 22nd annual conference on Computer Graphic and interactive techniques, pp. 309-316.

Non-Final Office Action for U.S. Appl. No. 13/893,191, dated Sep. 23, 2016, 41 pages.

\* cited by examiner

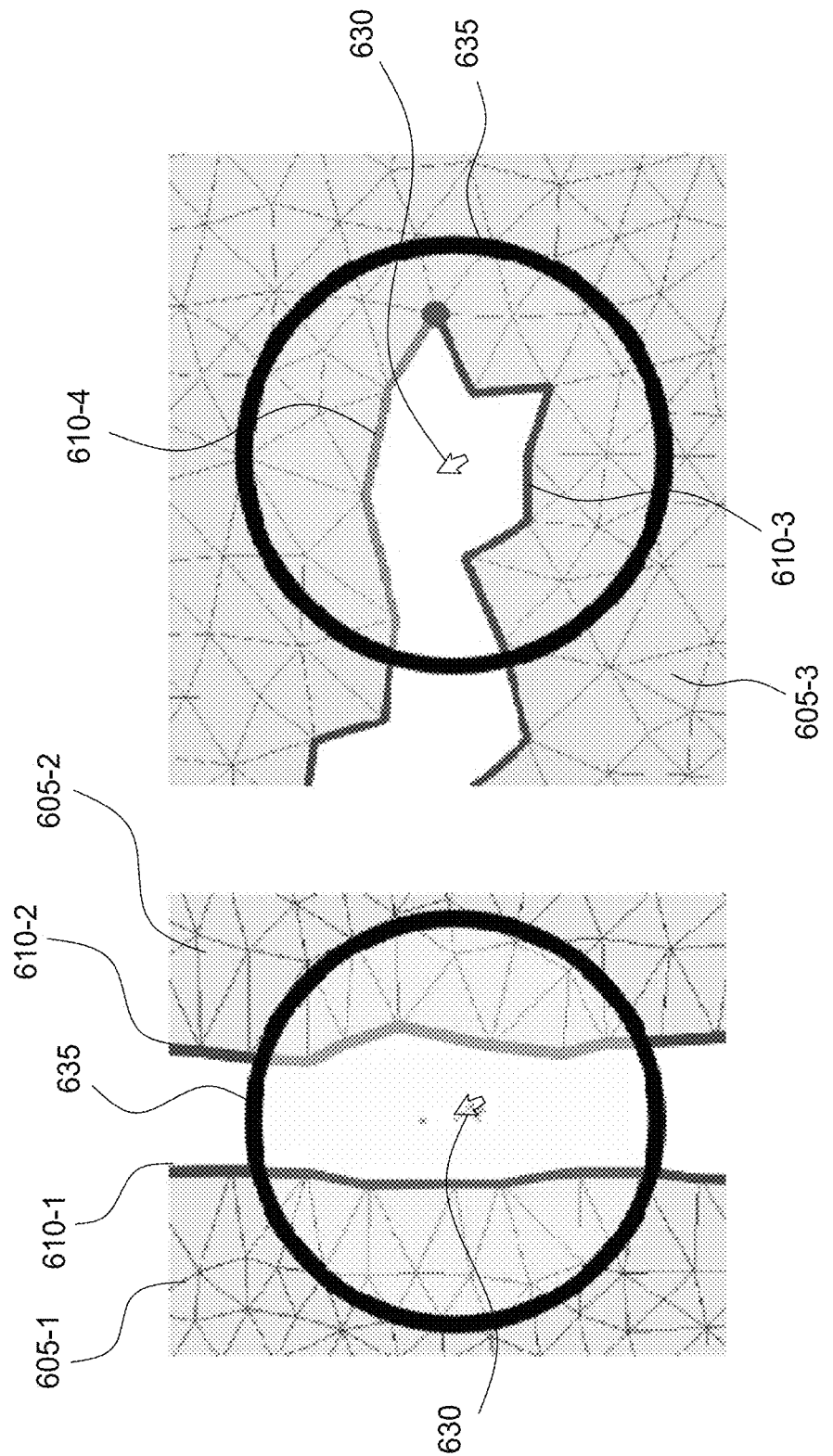

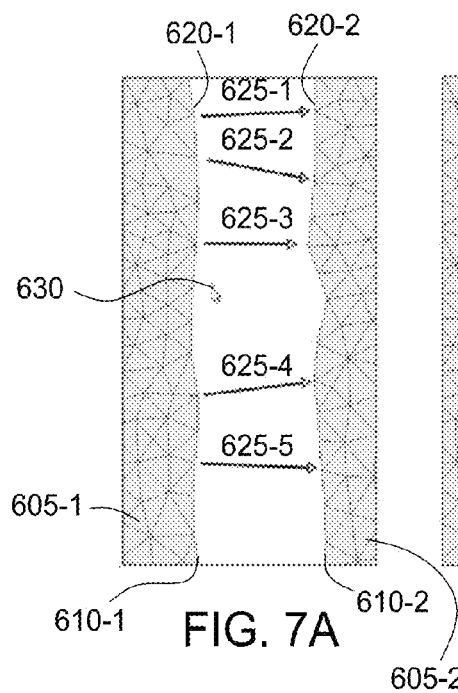
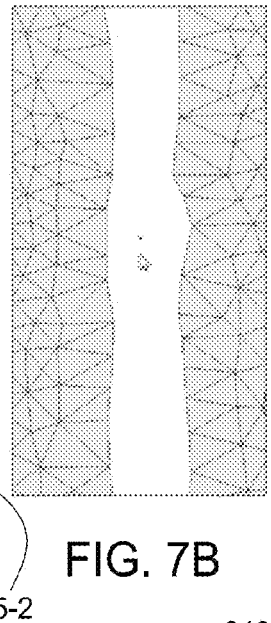
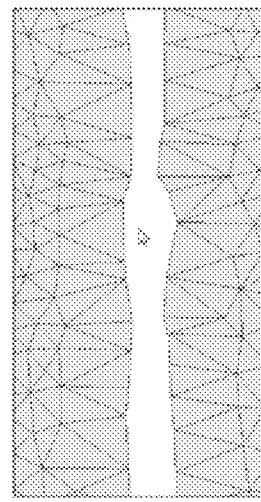
FIG. 7A  FIG. 7B  FIG. 7C
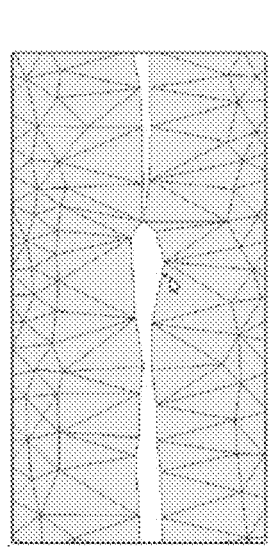
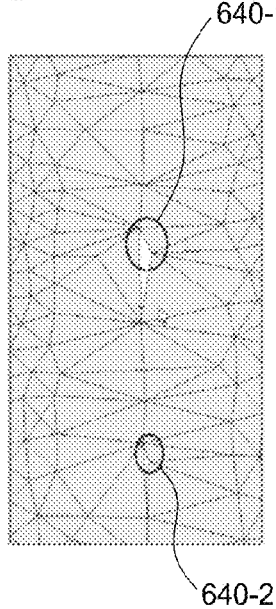
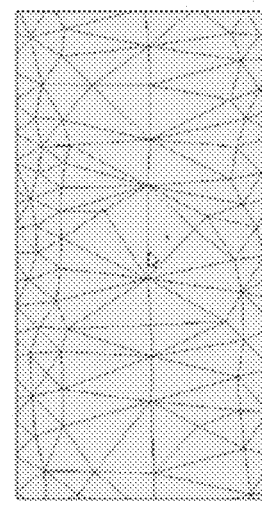
FIG. 7D  FIG. 7E  FIG. 7F

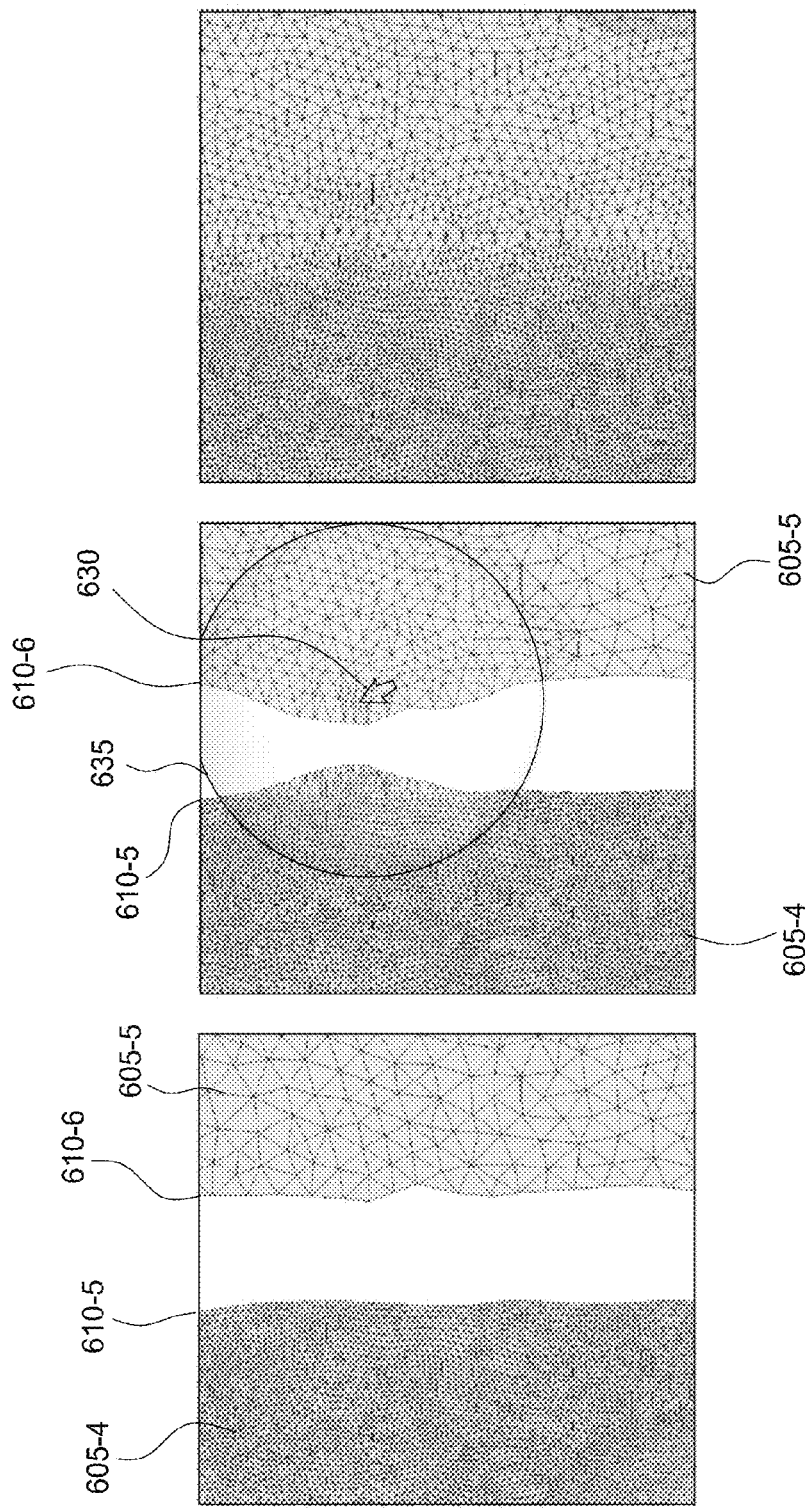

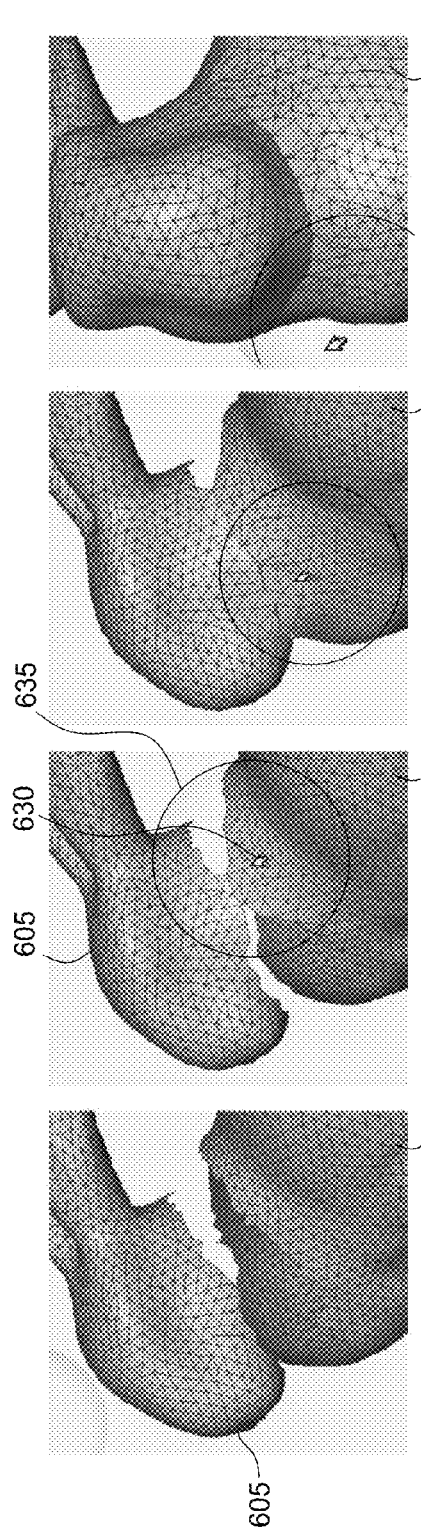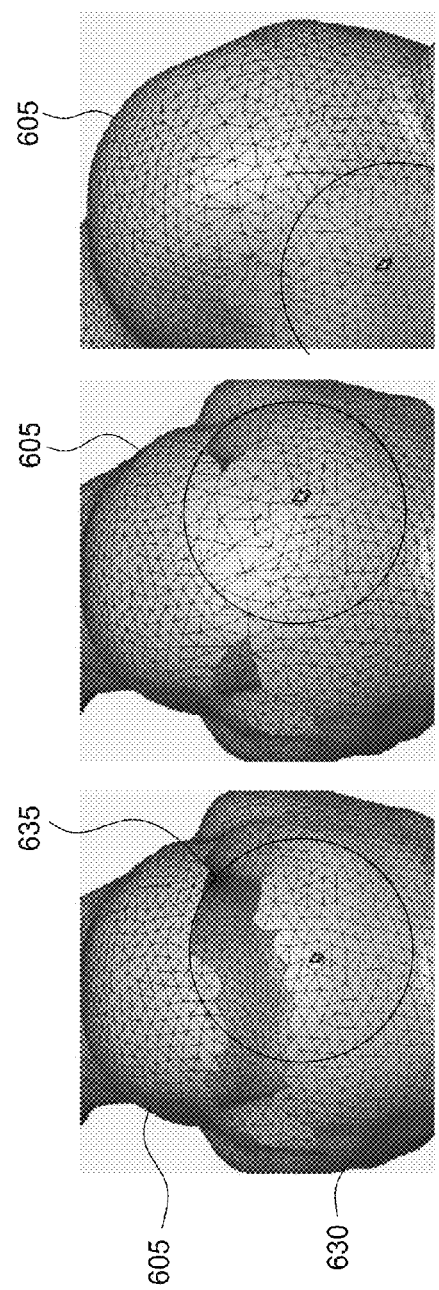

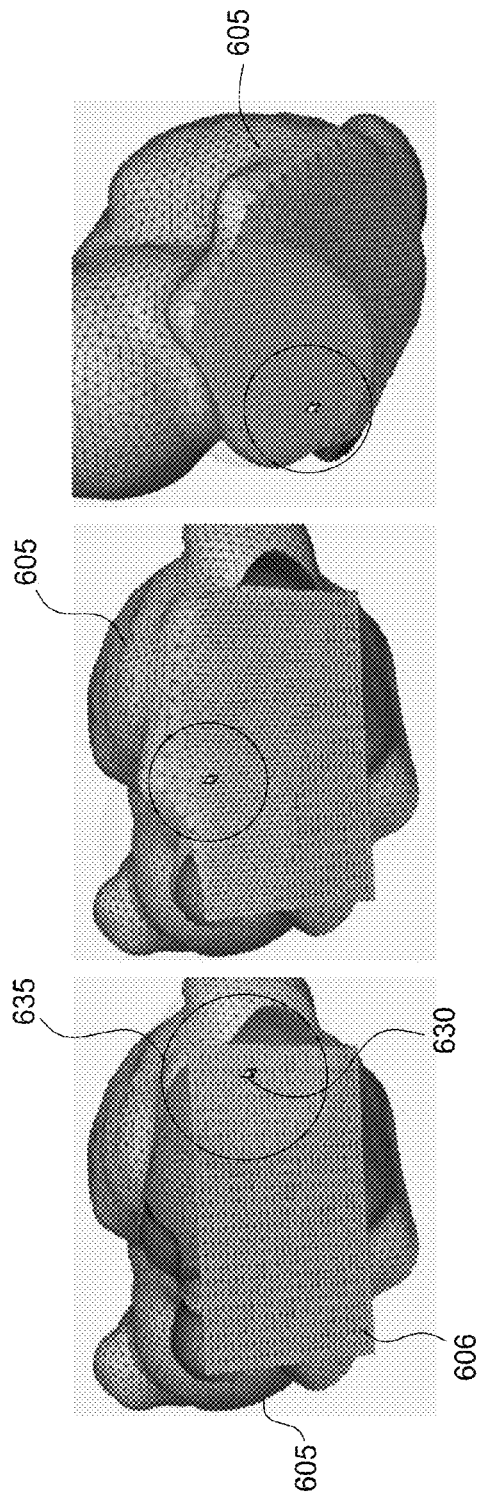
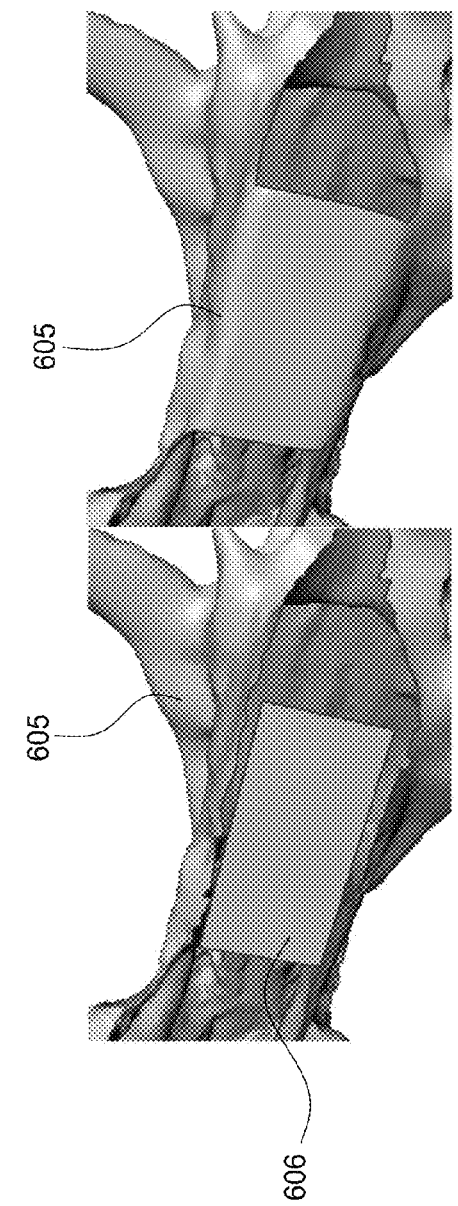
FIG. 11A  FIG. 11B  FIG. 11C  FIG. 11D  FIG. 11E

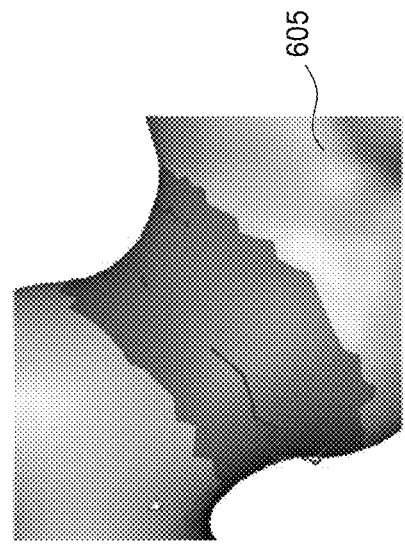
FIG. 12A
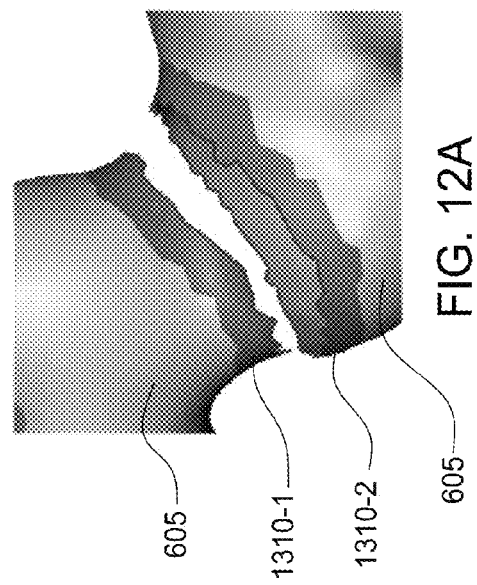
FIG. 12B
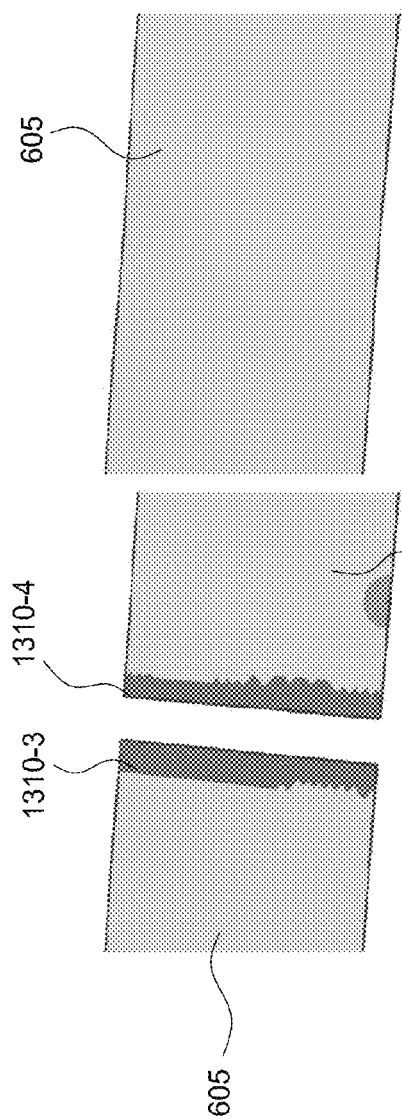
FIG. 12C
FIG. 12D

ADAPTIVELY ZIPPERING MESHES

CROSS-REFERENCE TO RELATED APPLICATIONS

This application claims benefit of U.S. Provisional Patent Application Ser. No. 61/646,603, filed May 14, 2012, which is herein incorporated by reference in its entirety.

BACKGROUND OF THE INVENTION

Field of the Invention

Embodiments of the present invention generally relate to computer-aided design (CAD) and, more specifically, to techniques for adaptively zippering meshes.

Description of the Related Art

A wide variety of software applications are currently available to end-users, including computer-aided design (CAD) applications, computer graphics applications, and three-dimensional (3D) modeling applications, among others. Many of these software applications allow an end-user to create and modify 2D and/or 3D designs. For example, an end-user may interact with a 3D modeling application to add geometry to a design, remove geometry from a design, extrude portions of the design, or join two or more designs. Such operations typically are performed by modifying a mesh of primitives (e.g., triangles) associated with the design.

In conventional software applications, merging two meshes typically requires the end-user to painstakingly prepare and modify each mesh. For example, merging two meshes may require the end-user to manually prepare the mesh boundaries at which the meshes are to be merged such that each vertex on the boundary of the first mesh matches up with a vertex on the boundary of the second mesh. Consequently, conventional software applications typically are unable to produce satisfactory results when attempting to merge meshes having different resolutions (e.g., different vertex/triangle densities). Additionally, even when processing meshes having similar resolutions, conventional software applications introduce significant mesh distortions and irregularities during the merging process. Such irregularities may produce numerical and computational issues and/or produce visual artifacts during subsequent processing of the mesh. Moreover, repairing mesh triangles affected by the merging process can be tedious and time-consuming for the end-user.

As the foregoing illustrates, there is a need in the art for a more effective way to enable application end-users to merge different meshes of primitives.

SUMMARY OF THE INVENTION

One embodiment of the present invention sets forth a method for zippering design meshes. The method involves identifying a first vertex associated with a first mesh boundary and having a first position and identifying a second vertex that is proximate to the first vertex and associated with a second mesh boundary, where the second vertex has a second position. The method further involves determining a third position based on the first position, the second position, and a zippering strength factor, where the third position is located in a region between the first position and the second position. Finally, the method involves moving the first vertex to the third position.

Further embodiments provide a non-transitory computer-readable medium and a computing device to carry out at least the method steps set forth above.

Advantageously, the disclosed technique allows a user to merge mesh surface boundaries in a manner that does not result in significant mesh distortions or irregularities. The boundaries at which the design meshes are to be merged may be easily specified by the user. A zippering algorithm may then be applied in an iterative manner (e.g., with a brush tool) to move vertices associated with one boundary towards vertices associated with another boundary, while at the same time refining mesh distortions and irregularities generated by the zippering process. The disclosed technique, among other things, enables design meshes having different triangle and vertex densities to be efficiently merged with relatively little pre-processing workload.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and with payment of the necessary fee.

FIGS. 6A and 6B illustrate a zippering operation performed on mesh boundaries, according to one embodiment of the present invention;

FIGS. 7A-7F illustrate a series of zippering iterations performed on neighboring mesh boundaries with the mesh zippering engine, according to one embodiment of the present invention;

FIGS. 8A-8C illustrate a series of zippering iterations performed on mesh boundaries having different vertex densities with the mesh zippering engine, according to one embodiment of the present invention;

FIGS. 10A-10G illustrate zippering operations performed to combine and modify meshes, according to one embodiment of the present invention;

FIGS. 11A-11E illustrate zippering operations performed to patch a mesh, according to one embodiment of the present invention; and FIGS. 12A-12D illustrate zippering meshes by issuing a zippering command on selected mesh boundaries, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
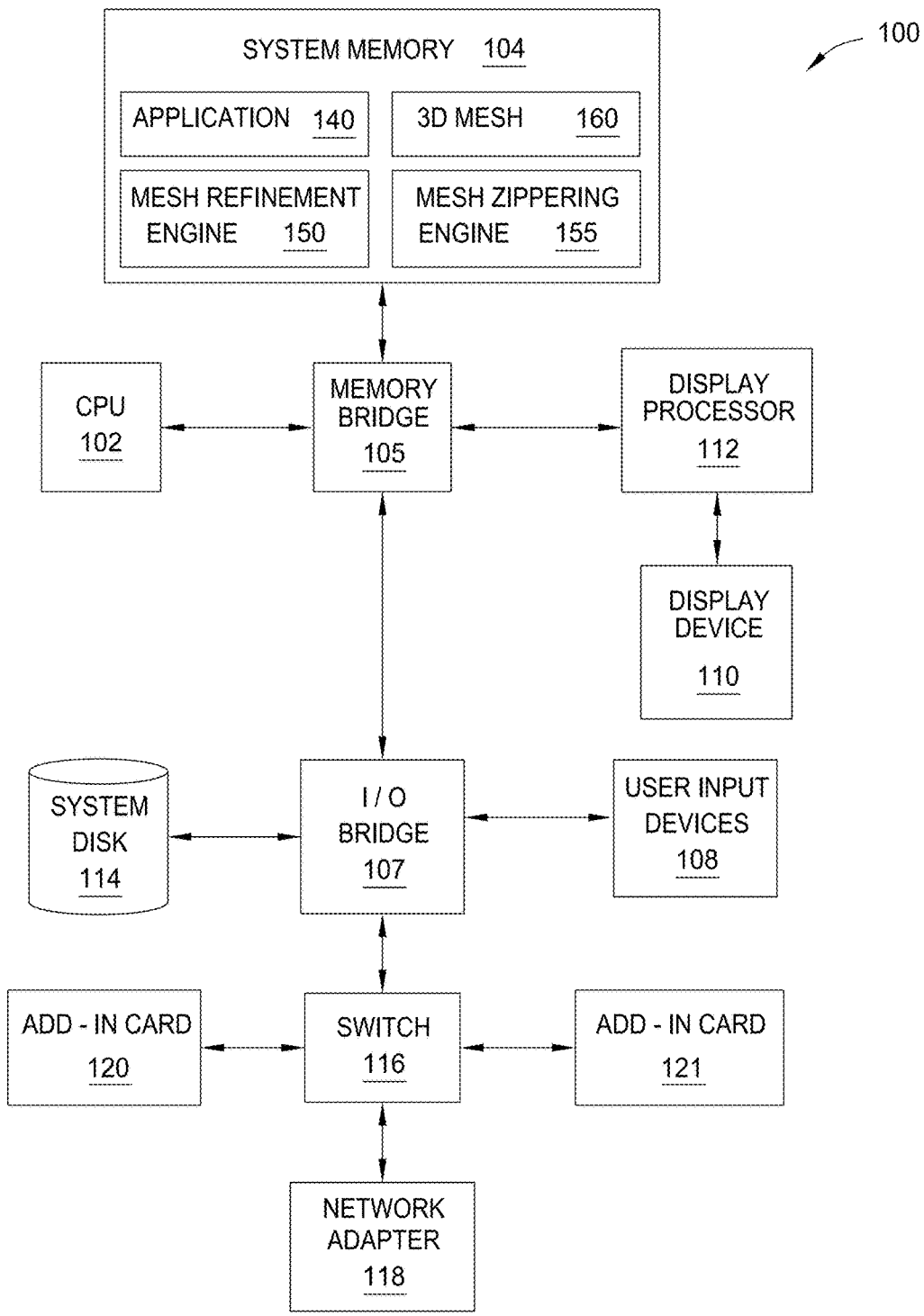
FIG. 1 illustrates a computing device configured to implement one or more aspects of the present invention.

FIG. 1 illustrates a computing device 100 configured to implement one or more aspects of the present invention. As shown, computing device 100 includes a memory bridge 105 that connects a central processing unit (CPU) 102, an input/output (I/O) bridge 107, a system memory 104, and a display processor 112.

Computing device 100 may be a computer workstation, a personal computer, video game console, personal digital assistant, mobile phone, mobile device or any other device suitable for practicing one or more embodiments of the present invention. As shown, the central processing unit (CPU) 102 and the system memory 104 communicate via a bus path that may include a memory bridge 105. CPU 102 includes one or more processing cores, and, in operation, CPU 102 is the master processor of computing device 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., conventional cathode ray tube, liquid crystal display, light-emitting diode, plasma, organic light-emitting diode, or surface-conduction electron-emitter based display). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network and may include wired or wireless communication over local area networks and wide area networks, such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

In one embodiment, application 140, mesh refinement engine 150, a mesh zippering engine 155, and 3D mesh 160 are stored in system memory 104. Although FIG. 1 shows the mesh refinement engine 150 and mesh zippering engine 155 as separate software modules, the mesh refinement engine 150 and mesh zippering engine 155 may be part of the same software executable. Additionally, the mesh refinement engine 150 and mesh zippering engine 155 may be integrated into the application 140 or offered as software add-ons or plug-ins for the application 140. Application 140 may be a CAD (computer aided design) application program configured to generate and display graphics data included in the 3D mesh 160 on display device 110. For example, the 3D mesh 160 could define one or more graphics objects that represent a 3D model designed using the CAD system or a character for an animation application program.

The mesh refinement engine 150 is configured to modify a mesh (e.g., 3D mesh 160) by performing one or more refinement operations on the mesh. The refinement operations may be applied to add, remove, replace, shift, etc. vertices and/or edges included in the mesh. For example, an edge operation may be performed on the mesh to add an edge (e.g., a triangle edge) to the mesh, remove an edge from the mesh, and/or shift the position of an edge in the mesh. Additionally, a vertex operation may be performed to add a vertex to the mesh, remove a vertex from the mesh, and/or shift the position of a vertex in the mesh. Other types of refinement operations, such as smoothing operations, also may be performed to improve the visual appearance of a mesh.

The mesh refinement engine 150 enables a user to iteratively refine a mesh, for example, by repairing mesh distortions produced when adding geometry to a mesh, removing geometry from a mesh, modifying the geometry of a mesh, and the like. For example, merging regions of a mesh may distort the mesh, producing mesh triangles having irregular sizes and angles near the merged regions. Such irregularities may produce computational issues and/or visual artifacts during subsequent processing of the mesh. However, by performing mesh refinement operations before, during, and/or after the merging process, mesh distortions may be reduced or eliminated.

The mesh zippering engine 155 is configured to modify a mesh, for example, by drawing vertices associated with a mesh boundary towards vertices associated with a neighboring mesh boundary. In addition, the mesh zippering engine 155 is configured align vertices associated with the neighboring boundaries, enabling the vertices to be welded (e.g., by combining all vertices within a specified distance from each other into a single vertex) to form a continuous mesh surface. For example, the mesh zippering engine 155 may, for each vertex associated with a mesh boundary, identify a nearest vertex associated with a neighboring mesh boundary and iteratively zipper the vertices together. Further, during and/or between zippering iterations, the mesh refinement engine 150 may perform refinement passes to repair mesh distortions produced by the zippering process. The details of various mesh refinement operations are described below with respect to FIGS. 2-5.

Figure 2:
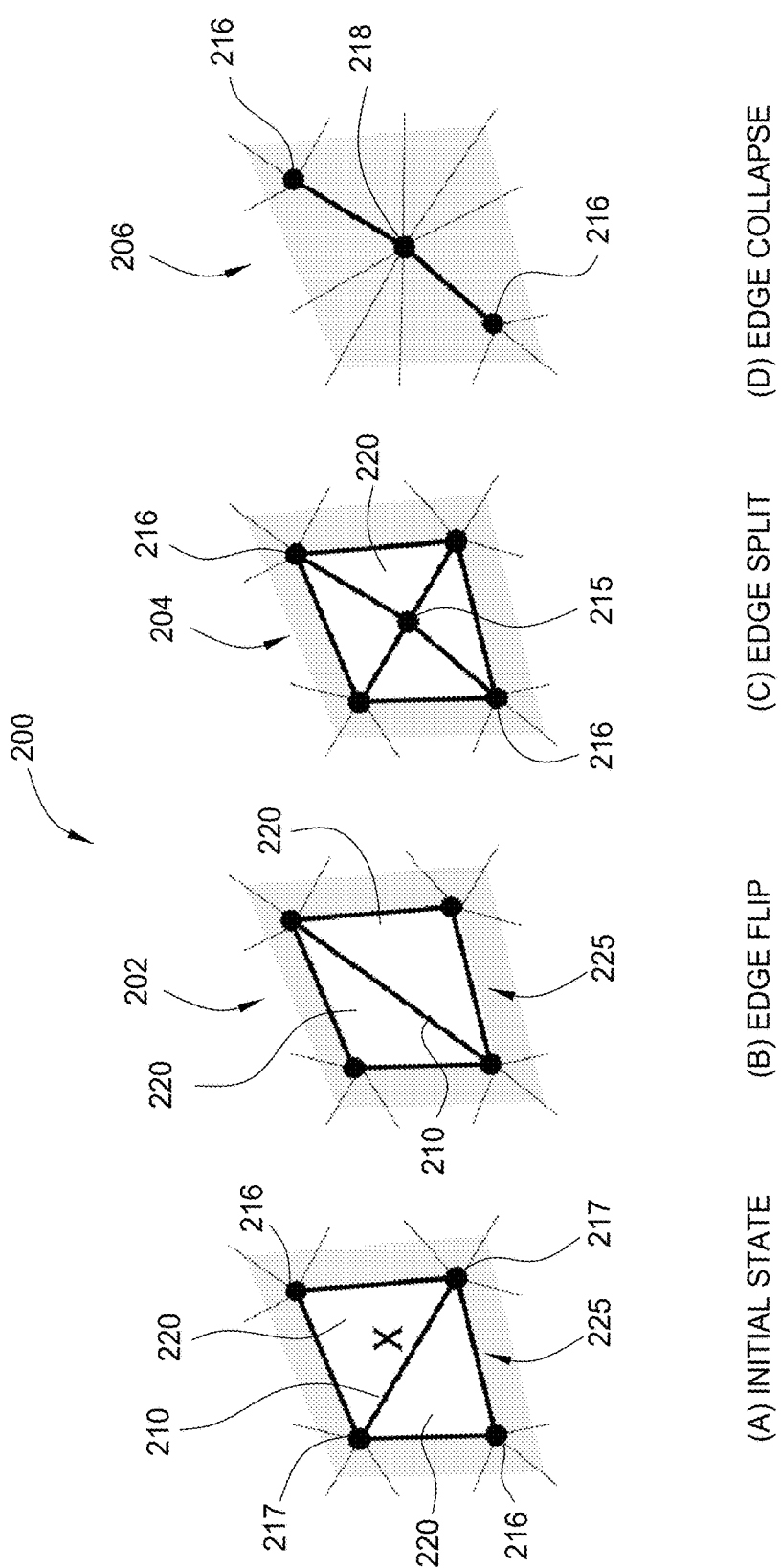
FIG. 2 illustrates edge operations for refining a mesh, according to one embodiment of the present invention.

FIG. 2 illustrates edge operations 200 for refining a mesh, according to one embodiment of the present invention. Edge operations 200 may be performed on a mesh to add an edge, remove an edge, and/or shift the position of an edge. Edge operations 200 may be applied to a mesh on a per-edge basis, or multiple edges may be processed in parallel.

As shown, the edge operations 200 include an edge flip operation 202, an edge split operation 204, and an edge collapse operation 206. An edge flip operation 202 is performed to rotate an edge 210 within the quadrilateral 225 formed by the two triangles 220 connected to the edge 210. An edge split operation 204 is performed to replace the two triangles 220 connected to the edge 210 with four triangles 220 by inserting a vertex 215 into the edge 210 and connecting the vertex 215 to the two vertices 216 opposite the edge 210. An edge collapse operation 206 removes the triangles 220 connected to the edge 210 and shifts the vertices 217 connected to the edge 210 to a new vertex position 218 (e.g., a midpoint of the initial edge 210). Conditions under which these edge operations 200 may be performed are described in further detail below with respect to FIG. 5.

Figure 3:
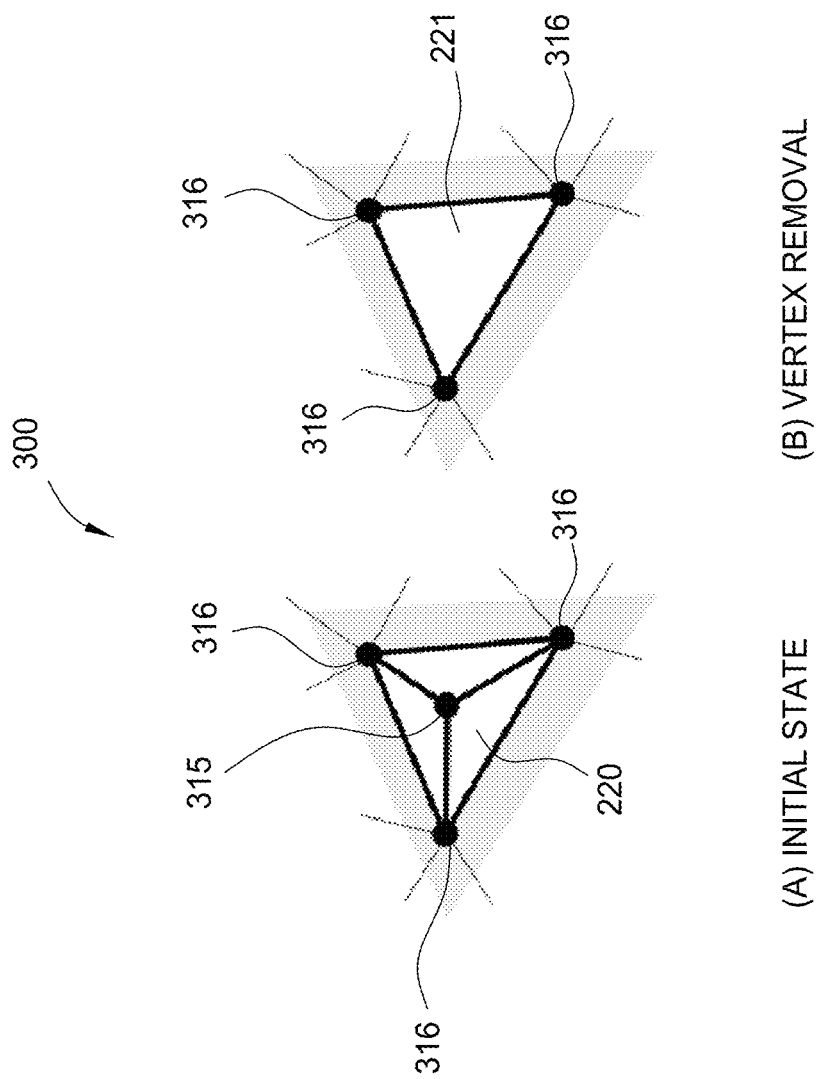
FIG. 3 illustrates a vertex removal operation for refining a mesh, according to one embodiment of the present invention.

FIG. 3 illustrates a vertex removal operation 300 for refining a mesh, according to one embodiment of the present invention. The vertex removal operation 300 may be applied to a mesh on a per-vertex basis, or multiple vertices may be processed in parallel. The vertex removal operation 300 may be performed to remove a vertex 315 connected to only three neighboring vertices 316 (i.e., a vertex 315 having a valence of three), also known as a tip vertex. Tip vertices 315 are necessarily surrounded by triangles 220 having large opening angles and, thus, may cause computational issues during subsequent processing of a mesh. Additionally, tip vertices 315 may collapse into the plane of their surrounding vertices 316 (e.g., when applying smoothing algorithms) and, as a result, may add little or no detail to the mesh. Consequently, to avoid such issues, tip vertices 315 may be removed via a vertex removal operation 300. After removal of a tip vertex 315, a new triangle 221 may be added to the mesh. Conditions under which a vertex removal operation 300 may be performed are described in further detail below with respect to FIG. 5.

Figure 4:
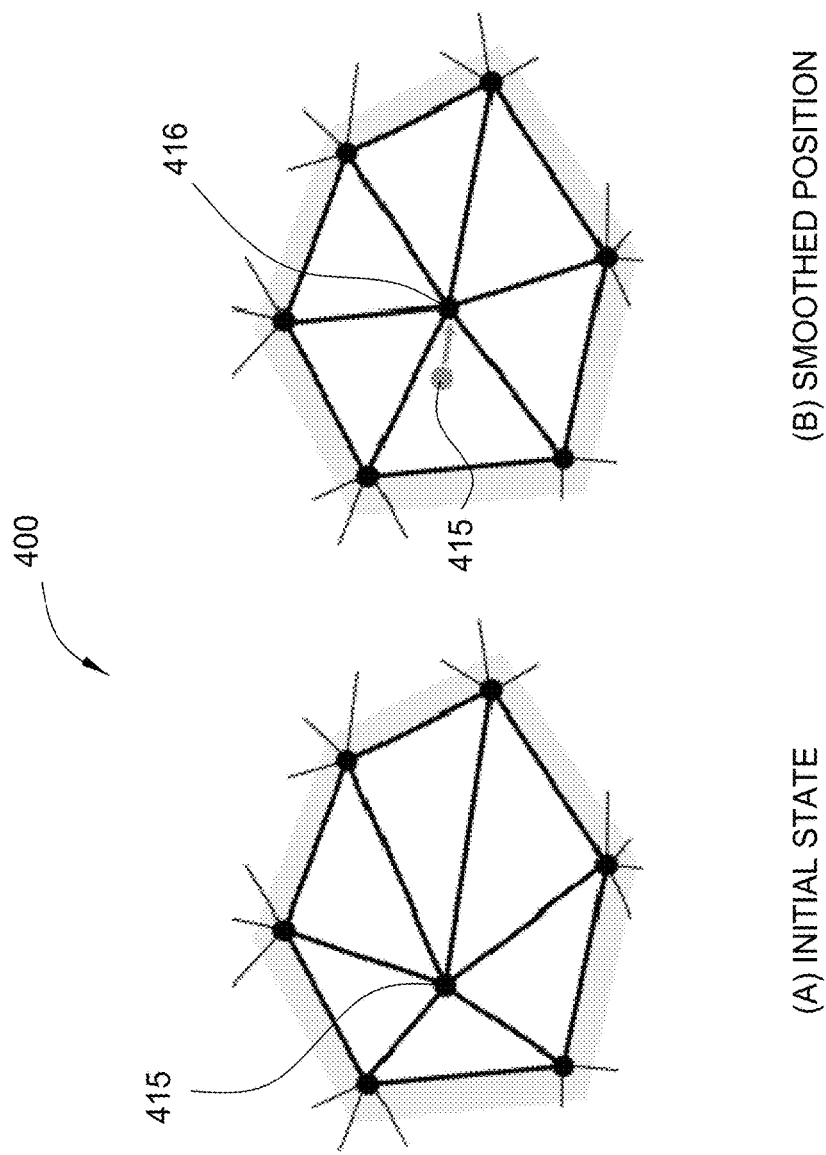
FIG. 4 illustrates a smoothing operation for refining a mesh, according to one embodiment of the present invention.

FIG. 4 illustrates a smoothing operation 400 for refining a mesh, according to one embodiment of the present invention. The smoothing operation 400 may be performed to more evenly distribute vertices in the mesh. In addition to improving the overall visual appearance of the mesh, the smoothing operation may be performed to reduce the number of small, irregularly-shed triangles that occur along mesh boundaries. Such triangles may be generated when edge operations are performed along preserved boundaries.

As shown, the smoothing operation 400 may shift a vertex 415 from an initial position to a smoothed vertex position 416. The location of the smoothed vertex position 416 may be based on a smoothing algorithm (e.g., a Laplacian smoothing algorithm) and a smoothing strength factor. Additional details regarding the smoothing operation 400 are described below with respect to FIG. 5.

Figure 5:
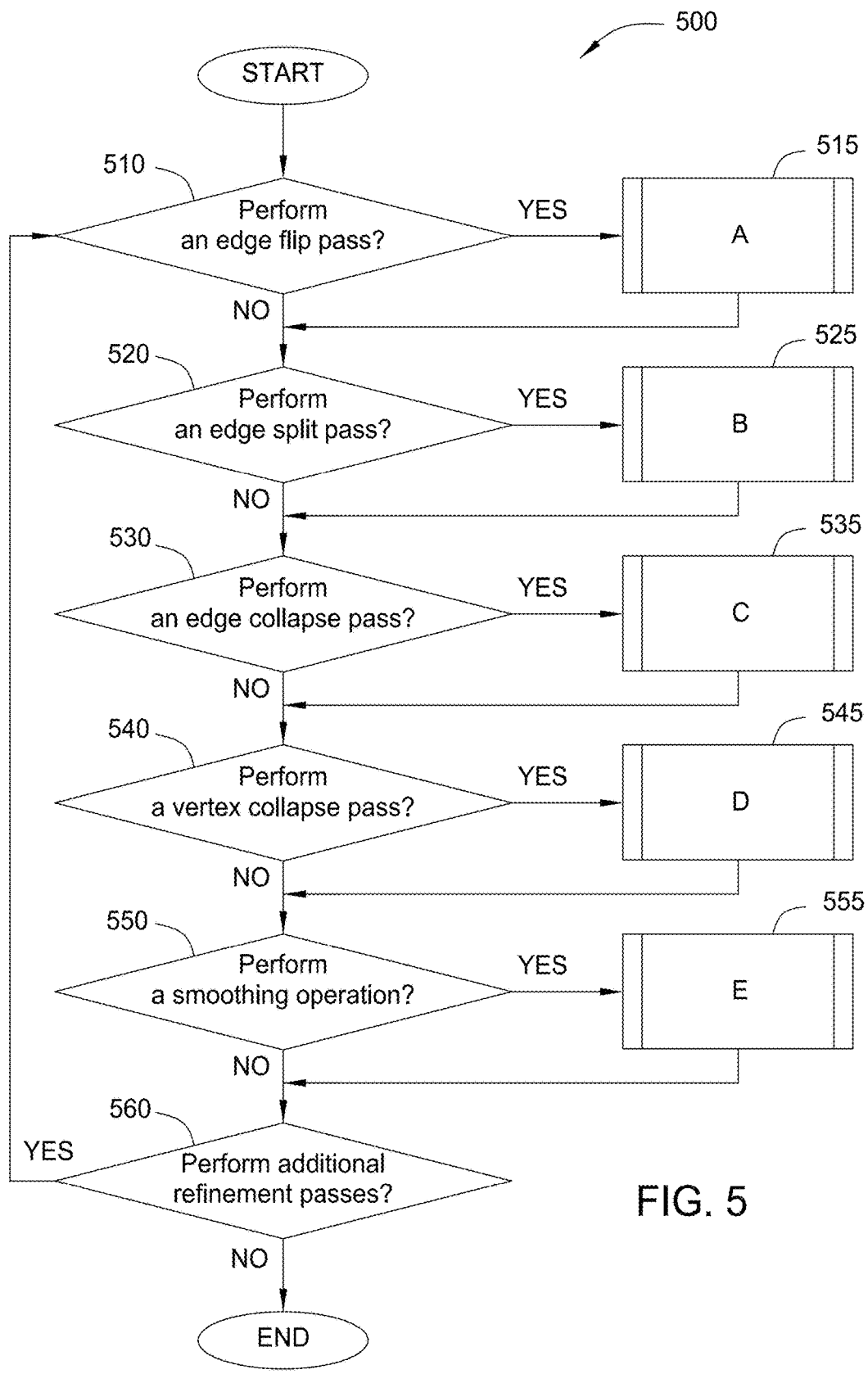
FIG. 5 is a flow diagram of method steps for refining a mesh of primitives, according to one embodiment of the present invention.

FIG. 5 is a flow diagram of method steps for refining a mesh of primitives, according to one embodiment of the present invention. Although the method steps are described in conjunction with the system of FIG. 1, persons skilled in the art will understand that any system configured to perform the method steps, in any order, falls within the scope of the present invention. Further, although mesh refinement operations are described as being performed in a particular order, the mesh refinement operations may be reordered and/or various mesh refinement operations may be repeated or omitted.

As shown, a method 500 begins at step 510, where the mesh refinement engine 150 determines whether to perform an edge flip pass on one or more edges 210 included in a mesh. During the edge flip pass, the mesh refinement engine 150 processes the edge(s) 210 to determine whether an edge flip operation 202 should be performed on the edge(s) 210.

If the mesh refinement engine 150 determines that an edge flip pass should be performed, then subprocess A is executed at step 515.

Subprocess A—Edge Flip Operation

Upon executing subprocess A at step 515, the mesh refinement engine 150 identifies a triangle edge 210 included in a mesh. The mesh refinement engine 150 then optionally determines whether the edge 210 is on a preserved boundary of the mesh. A preserved boundary may include a limit (e.g., an outermost perimeter) of the mesh itself and/or a boundary selected by a user or generated by the mesh refinement engine 150. For example, the user may select a region of interest (ROI) in which mesh refinement operations are to be performed. Upon selecting the ROI, the user may further determine whether mesh refinement operations performed within the ROI are permitted to affect regions of the mesh that are outside of the ROI (e.g., in proximity to the ROI). If the mesh refinement operations are permitted to affect regions of the mesh outside of the ROI, then triangles adjacent or proximate to the ROI may be modified when performing mesh refinement operations. If the mesh refinement operations are not permitted to affect regions of the mesh outside of the ROI (i.e., the ROI boundary is a preserved boundary), then the position, shape, etc. of the ROI boundary may be retained, and triangles outside of the ROI are not modified when performing mesh refinement operations. Additionally, the user may pin one or more locations along the ROI boundary to prevent the mesh refinement engine 150 from modifying the position and shape of vertices and triangles at the pinned locations while allowing the mesh refinement engine 150 to modify other (e.g., unpinned) locations along the ROI boundary.

If the edge 210 is located on a preserved boundary (e.g., an ROI boundary, perimeter of the mesh, etc.), then the mesh refinement engine 150 determines not to flip the edge 210. As such, the preserved boundary is not modified. If the edge 210 is not located on a preserved boundary, then the mesh refinement engine 150 determines a potential flipped edge 210. Next, the mesh refinement engine 150 computes the length of the flipped edge 210 and compares this length to the product of a flip threshold $K_{flip}$ and the length of the initial edge 210. The flip threshold $K_{flip}$ is intended to reduce the occurrence of edge flips that do not significantly improve mesh quality. For example, by setting the flip threshold $K_{flip}$ to a value of 0.9, an edge 210 is flipped only if the flipped edge 210 is appreciably shorter than the initial edge 210. Other values for the flip threshold $K_{flip}$ (e.g., 0.95, 0.8, 0.75, etc.) may be selected as well.

If the length of the flipped edge 210 is greater than the product of the flip threshold $K_{flip}$ and the length of the initial edge 210, then the mesh refinement engine 150 determines not to flip the edge 210. If the length of the flipped edge 210 is not greater than the product of the flip threshold $K_{flip}$ and the length of the initial edge 210, then the mesh refinement engine 150 next determines a distance between the midpoint of the initial edge 210 and the midpoint of the flipped edge 210. The distance is then compared to the product of the midpoint threshold $K_{midpoint}$ and the length of the initial edge 210. The midpoint threshold $K_{midpoint}$ is intended to reduce the occurrence of edge flips that significantly change the shape of the mesh. For example, by setting the midpoint threshold $K_{midpoint}$ to a value of 0.2, an edge 210 is flipped only if the flipped edge 210 is in a plane that is near the plane in which the initial edge 210 resides. Other values for the midpoint threshold $K_{midpoint}$ (e.g., 0.1, 0.3, etc.) may be selected as well.

If the distance is greater than the product of the midpoint threshold $K_{midpoint}$ and the length of the initial edge 210, then the mesh refinement engine 150 determines not to flip the edge 210. If the distance is not greater than the product of the midpoint threshold $K_{midpoint}$ and the length of the initial edge 210, then the mesh refinement engine 150 next determines whether flipping the edge 210 would create a non-manifold edge. A non-manifold edge may be defined as an edge that is shared by more than two faces (e.g., an edge shared by more than two triangles). If flipping the edge 210 would create a non-manifold edge, then the mesh refinement engine 150 determines not to flip the edge 210. If flipping the edge 210 would not create a non-manifold edge, then the mesh refinement engine 150 flips the edge 210. Finally, the mesh refinement engine 150 determines whether to process another edge 210 included in the mesh. If another edge 210 is to be processed by the mesh refinement engine 150, then the mesh refinement engine 150 identifies another edge 210 included in the mesh and repeats the process described above. If no additional edges 210 are to be processed, then subprocess A ends, and the method proceeds to step 520.

At step 520, the mesh refinement engine 150 determines whether to perform an edge split pass on one or more edges 210 included in a mesh (e.g., to determine whether an edge split operation 204 should be performed on the edge(s) 210). If the mesh refinement engine 150 determines that an edge split pass should be performed, then subprocess B is executed at step 525.

Subprocess B—Edge Split Operation

Upon executing subprocess B at step 525, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to split the edge 210. If the edge 210 is not located on a preserved boundary, then the mesh refinement engine 150 compares a weighted length of the edge 210 to a split threshold $K_{split}$. The split threshold $K_{split}$ may be defined as the target maximum edge length. That is, by performing this comparison, at the end of an edge split pass, all processed edges 210 may be shorter than the split threshold $K_{split}$ length.

The weighting applied to the length of the edge 210 may be based on the per-vertex refinement weights assigned to the two vertices 217 to which the edge 210 is connected. The per-vertex refinement weights may be assigned to vertices by the mesh refinement engine 150, or the per-vertex refinement weights may be based on user selection (e.g., based on a weight refinement mask). In general, refinement weights assigned to vertices, edges, etc. may control the conditions under which a refinement operation is performed. For example, assigning a higher weighting to a vertex may increase the likelihood that a refinement operation will be performed on the vertex (e.g., a vertex collapse operation 300) or on an edge associated with the vertex (e.g., an edge split operation 204). Conversely, assigning a lower weighting to a vertex may decrease the likelihood that a refinement operation will be performed on the vertex or on an edge associated with the vertex. Further, assigning a zero weighting to a vertex may indicate that a refinement operation will not be performed on the vertex or on an edge associated with the vertex.

If the weighted length of the edge 210 is not greater than the split threshold $K_{split}$, then the mesh refinement engine 150 determines not to split the edge 210. If the weighted length of the edge 210 is greater than the split threshold $K_{split}$, then the mesh refinement engine 150 adds the edge 210 to a split edge list. Next, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then the edge(s) 210 included in the split edge list are optionally sorted by length. Finally, the edge(s) 210 included in the split edge list are split. If the edges 210 were sorted, then the edges 210 included in the split edge list may be split in order of longest edge length to shortest edge length. Once all edges on the split edge list have been split, subprocess B ends, and the method proceeds to step 530.

At step 530, the mesh refinement engine 150 determines whether to perform an edge collapse pass on one or more edges 210 included in a mesh (e.g., to determine whether an edge collapse operation 206 should be performed on the edge(s) 210). If the mesh refinement engine 150 determines that an edge collapse pass should be performed, then subprocess C is executed at step 535.

Subprocess C—Edge Collapse Operation

Upon executing subprocess C at step 535, the mesh refinement engine 150 identifies a triangle edge 210 included in a mesh. The mesh refinement engine 150 then optionally determines whether the edge 210 is on a preserved boundary of the mesh. If the edge 210 is located on a preserved boundary (e.g., an ROI boundary, perimeter of the mesh, etc.), then the mesh refinement engine 150 determines not to collapse the edge 210. If the edge 210 is not located on a preserved boundary, then the mesh refinement engine 150 next determines whether at least one of two inequalities are satisfied. With reference to the first inequality, the mesh refinement engine 150 determines whether a weighted length (e.g., based on per-vertex refinement weights described above) of the edge 210 is greater than a collapse threshold $K_{collapse}$. The collapse threshold $K_{collapse}$ is intended to collapse edges 210 that are shorter than the value assigned to this threshold. With reference to the second inequality, the mesh refinement engine 150 determines whether a minimum opposing angle of one of the two triangles connected to the edge 210 is less than a target angle $T_{collapse}$. The target angle $T_{collapse}$ is intended to collapse triangles 220 having an angle that is less than the value assigned to this target. Thus, after an edge collapse pass, all angles included in the processed triangles 220 may be greater than the target angle $T_{collapse}$. Furthermore, because this criterion is scale-independent (e.g., the target angle $T_{collapse}$ does not depend on the relative size of triangles in the mesh), mesh quality may be significantly improved even if $K_{collapse}$ is assigned an inappropriate value.

If one or both of the first inequality and second inequality are satisfied, the mesh refinement engine 150 then determines whether collapsing the edge 210 would create a non-manifold edge. If collapsing the edge 210 would create a non-manifold edge, then the mesh refinement engine 150 determines not to collapse the edge 210. If collapsing the edge 210 would not create a non-manifold edge, then the mesh refinement engine 150 collapses the edge 210. Finally, the mesh refinement engine 150 determines whether to process another edge 210 included in the mesh. If another edge 210 is to be processed by the mesh refinement engine 150, then another edge 210 included in the mesh is identified, and the process described above is repeated. If no additional edges 210 are to be processed, then subprocess C ends, and the method proceeds to step 540.

At step 540, the mesh refinement engine 150 determines whether to perform a vertex collapse pass on one or more vertices 315 included in a mesh (e.g., to determine whether a vertex collapse operation 300 should be performed on the vertices 315). If the mesh refinement engine 150 determines that a vertex collapse pass should be performed, then subprocess D is executed at step 545.

Subprocess D—Vertex Collapse Operation

Upon executing subprocess D at step 545, the mesh refinement engine 150 identifies a triangle vertex 315 included in a mesh. The mesh refinement engine 150 then optionally determines whether the vertex 315 is on a preserved boundary of the mesh. If the vertex 315 is located on a preserved boundary (e.g., an ROI boundary, perimeter of the mesh, etc.), then the mesh refinement engine 150 determines not to collapse the vertex 315. If the vertex 315 is not located on a preserved boundary, then the mesh refinement engine 150 determines whether the vertex 315 has a valence equal to three (i.e., the vertex 315 is connected to only three neighboring vertices 316). If the vertex 315 does not have a valence equal to three, then the vertex 315 is not collapsed.

If the vertex 315 has a valence equal to three, then the mesh refinement engine 150 optionally determines whether all triangles connected to the vertex 315 are located within the ROI. If all triangles connected to the vertex 315 are not located within the ROI, then the vertex 315 is not collapsed. If all triangles connected to the vertex 315 are located within the ROI, then the mesh refinement engine 150 next determines whether a neighboring vertex 316 has a valence higher than three. If no neighboring vertex 316 has a valence higher than three, then the vertex 315 is not collapsed. If a neighboring vertex 316 has a valence higher than three, then the vertex 315 is collapsed and a new triangle 221 is added to the mesh. Finally, the mesh refinement engine 150 determines whether to process another vertex 315 included in the mesh. If another vertex 315 is to be processed by the mesh refinement engine 150, then another vertex 315 included in the mesh is identified, and the process described above is repeated. If no additional vertices 315 are to be processed, then subprocess D ends, and the method proceeds to step 550.

At step 550, the mesh refinement engine 150 determines whether to perform a smoothing operation 400 on one or more vertices 415 included in a mesh. If the mesh refinement engine 150 determines that a smoothing operation 400 should be performed, then subprocess E is executed at step 555.

Subprocess E—Smoothing Operation

Upon executing subprocess E at step 555, the mesh refinement engine 150 identifies a triangle vertex 415 included in a mesh. The mesh refinement engine 150 then determines a smoothed vertex position 416. The smoothed vertex position 416 may be determined using a smoothing algorithm, such as a uniform Laplacian smoothing algorithm. Next, a smoothing weight may be determined based on a strength factor and/or a weight function value. The strength factor may be a user-defined value (e.g., a brush tool parameter in application 140). The weight function value may be based on a weight mask generated by the mesh refinement engine 150 or defined by the user.

Next, a weighted vertex position is determined based on the smoothed vertex position 416 and (optionally) based on the smoothing weight. For example, the weighted vertex position may be computed by interpolating the initial vertex position 415 and the smoothed vertex position 416 or by performing linear blending using the initial vertex position 415 (V), the smoothed vertex position 416 (V'), and the smoothing weight (WS). An exemplary formula for performing linear blending to determine a weighted vertex position (V") is provided in Equation 1, below.

$$V''=(1-WS) \times V + (WS) \times V'  \quad (\text{Eq. 1})$$

Finally, at step 560, the mesh refinement engine 150 determines whether to perform additional mesh refinement passes. If the mesh refinement engine 150 determines that additional refinement passes should be performed, then the method returns to step 510, as previously described herein. Alternatively, upon determining that additional refinement passes should be performed, the method may return to any of step 510, step 520, step 530, step 540, and/or step 550, as also previously described herein. Furthermore, the flow diagram may be traversed such that one or more of the edge operations 200 are performed before and/or after the vertex collapse operation 300 and/or the smoothing operation 400. If the mesh refinement engine 150 determines that additional refinement passes should not be performed, then the method ends.

In addition to repairing mesh distortions and irregularities, the mesh refinement engine 150 enables a user to perform other types of mesh operations. For example, when used in conjunction with the mesh zippering engine 155, the mesh refinement engine 150 enables a user to merge two or more meshes in a manner that requires relatively little pre-processing workload. Such techniques are described below in further detail.

Adaptively Zippering Meshes

FIGS. 6A and 6B illustrate a zippering operation performed on mesh boundaries 610, according to one embodiment of the present invention. As shown, a user may select mesh boundaries 610 (e.g., 610-1, 610-2) associated with multiple 3D meshes 605 (e.g., 605-1, 605-2), or mesh boundaries 610 (e.g., 610-3, 610-4) associated with a single 3D mesh 605 (e.g., 605-3). The mesh boundaries 610 may then be zippered together using a zippering operation. In various implementations, the zippering operation may be performed by selecting each mesh boundary 610 and issuing a zipper command. In other implementations, the zippering operation may be performed via a brush tool 630. For example, the user may operate a brush tool 630 to highlight and "scrub" a region containing mesh boundaries 610 to iteratively zipper the mesh boundaries 610.

When the zippering operation is performed using a brush tool 630, the mesh zippering engine 155 may identify vertices associated with mesh boundaries 610 that are within a brush tool radius 635. After identifying a first vertex located within the brush tool radius 635, the mesh zippering engine 155 may identify a second vertex that is associated with a neighboring mesh boundary and nearest to the first vertex. The mesh zippering engine 155 may then move the first vertex towards the second vertex and/or move the second vertex towards the first vertex. The distance that the first vertex is moved towards the second vertex (or vice versa) may be based a zippering strength factor and/or the initial distance between the vertices. For example, the first vertex may be moved a distance that is determined by multiplying the initial distance between the vertices by the zippering strength factor. After moving the first vertex and/or the second vertex, the mesh zippering engine 155 may identify and move additional sets of vertices. This iterative process of zippering mesh boundaries 610 is described below in further detail with respect to FIGS. 7A-7F.

Characteristics of the zippering operation may be modified by enabling the user to select and associate various operating parameters with the brush tool 630. For example, the user may modify the size of the brush tool 630 by selecting a desired brush tool radius 635 and/or the user may modify the strength with which the zippering operation is performed by selecting a desired zippering strength factor. Alternatively, the zippering strength factor may be modulated by the user based on an operational characteristic of an input device. For instance, the zippering strength factor may be modulated as a function of the pressure applied by the user when operating a pressure-sensitive input device (e.g., a pressure-sensitive stylus and/or touchscreen device). Additionally, the user may select a falloff function for the brush tool 630 to specify how the zippering strength factor varies as a function of distance from the brush tool 630. For example, the falloff function may specify that the zippering strength factor decreases with distance from the brush tool 630 center (e.g., decreases towards the extents of the brush tool radius 635).

FIGS. 7A-7F illustrate a series of zippering iterations performed on neighboring mesh boundaries 610 with the mesh zippering engine 155, according to one embodiment of the present invention. As described above, the mesh zippering engine 155 first identifies a first vertex 620-1 associated with a first mesh boundary 610-1 and a second vertex 620-2 that is associated with a neighboring mesh boundary 610-2 and is nearest to the first vertex 620-1. The first vertex 620-1 and the second vertex 620-2 (e.g., vertex pair 625-1) are then moved closer to one another. Additional vertex pairs 625 (e.g., 625-2, 625-3, 625-4, 625 etc.) may then be identified and iteratively zippered together. Consequently, as shown, after each zippering iteration, the vertex pairs 625 are aligned and brought closer together. Once the vertices 620 associated with a vertex pair 625 are brought within a threshold distance of one another and/or are sufficiently aligned, the vertices 620 may be "welded" to form a single vertex 620, as shown in FIG. 7F.

During the zippering process, the mesh refinement engine 150 may perform one or more types of mesh refinement operations. For example, as shown in FIGS. 7E and 7F, the mesh refinement engine 150 may perform an edge collapse operation 206 to remove one or more edges and/or vertices on or near the neighboring mesh boundaries 610. For example, during or between zippering iterations, the mesh refinement engine 150 may determine that a first edge 640-1 and a second edge 640-2 are shorter than a collapse threshold $K_{collapse}$ length. The first edge 640-1 and the second edge 640-2 may then be collapsed, improving the alignment between the mesh boundary vertices 620. Additionally, other types of mesh refinement operations (e.g., edge split operation 204 and smoothing operation 400) may be performed to repair mesh distortions and improve triangle regularity near the zippered mesh boundaries. In addition to repairing mesh distortions, applying mesh refinement operations during and/or between zippering iterations enables a user to perform zippering operations on mesh boundaries 610 which include different vertex 620 densities, an example of which is described below with respect to FIGS. 8A-8C.

FIGS. 8A-8C illustrate a series of zippering iterations performed on mesh boundaries 610 having different vertex densities with the mesh zippering engine 155, according to one embodiment of the present invention. As shown, the mesh boundary 610-5 associated with 3D mesh 605-4 has a higher vertex density than the mesh boundary 610-6 associated with 3D mesh 605-5. In general, when performing a zippering operation, multiple vertices associated with the higher density mesh boundary 610-5 are drawn towards a single vertex associated with the lower density mesh boundary 610-6. Consequently, after several zippering iterations, the multiple of vertices may become squeezed together, reducing the sizes and angles of edges associated with the multiple vertices. However, such edges may be removed (e.g., collapsed) by performing one or more mesh refinement passes during and/or between zippering iterations. Thus, as multiple vertices associated with the higher density mesh boundary 610-5 merge toward a single vertex associated with the lower density mesh boundary 610-6, the mesh refinement engine 150 may collapse the multiple vertices into a single vertex to better match the vertex densities at the mesh boundaries 610. In addition, various mesh refinement operations (e.g., edge split operations 204) may be performed on vertices located on or near the lower density mesh boundary 610-6 to increase the vertex density near the mesh boundary 610-6. Accordingly, as shown in FIG. 8C, after a series of zippering iterations and mesh refinements passes, vertices associated with the mesh boundaries 610-5, 610-6 are aligned and zippered together. Further, the vertex densities of the respective 3D meshes 605-4, 605-5 have been blended together, reducing mesh distortions and creating a pleasing visual appearance.

In addition to enabling the user to control zippering parameters associated with a brush tool 630, the user may specify parameters to be used when performing mesh refinement passes during and/or between zippering iterations. In one implementation, mesh refinement parameters may be selected such that the mesh refinement passes increase or decrease vertex densities proximate to the zippered region. Mesh refinement parameters may be selected such that mesh boundaries having different vertex densities are blended towards the higher resolution or towards the lower resolution. In one example, mesh refinement parameters may be selected such that an edge collapse threshold is assigned a value that is approximately 50% (e.g., approximately 40% to 60%) of the value assigned to an edge split threshold and/or approximately 50% (e.g., approximately 40% to 60%) of the value assigned to a smoothing weight parameter. These particular parameter values may enable mesh boundaries 610 having similar or different vertex densities to be zippered in a manner that produces a smooth transition between the mesh boundaries 610 and reduces the frequency and magnitude of mesh distortions.

Figure 9:
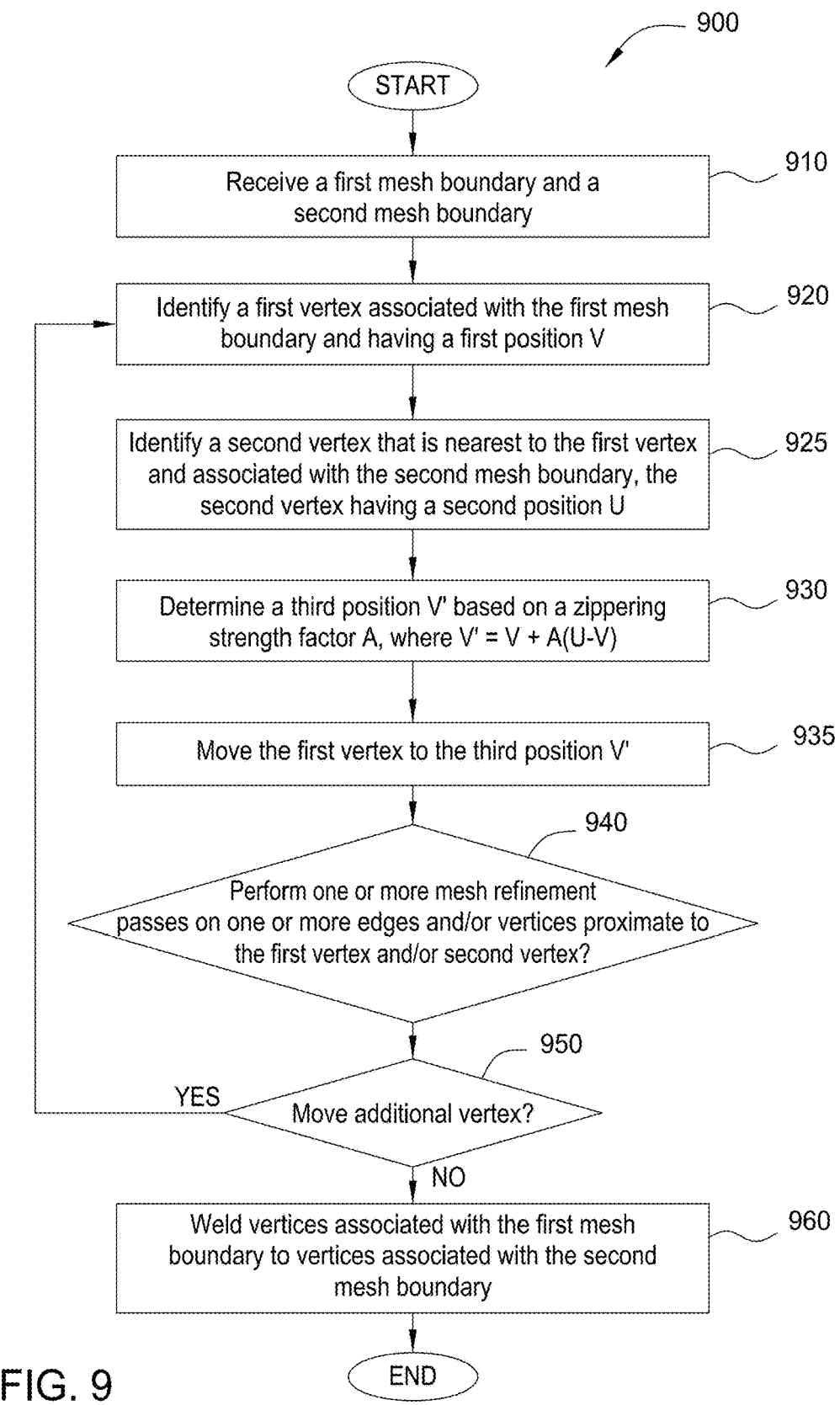
FIG. 9 is a flow diagram of method steps for zippering a boundary between two different meshes of primitives, according to one embodiment of the present invention.

FIG. 9 is a flow diagram of method steps for zippering a boundary between two different meshes of primitives, according to one embodiment of the present invention. Although the method steps are described in conjunction with the system of FIG. 1, persons skilled in the art will understand that any system configured to perform the method steps, in any order, falls within the scope of the present invention.

As shown, a method 900 begins at step 910, where a first mesh boundary 610 (e.g., 610-1) and a second mesh boundary 610 (e.g., 610-2) are received by the mesh zippering engine 155. At step 920, a first vertex 620 (e.g., 620-1) associated with the first mesh boundary 610 and having a first position V is identified by the mesh zippering engine 155. At step 925, a second vertex 620 (e.g., 620-2) that is nearest to the first vertex 620, is associated with the second mesh boundary 610, and has a second position U is identified by the mesh zippering engine 155.

Next, at step 930, the mesh zippering engine 155 determines a third position V'. In one implementation, the third position V' may be based on the first position V, the second position U, and a zippering strength factor A. The zipper strength factor A may be in the range [0, 0.5]. In general, a lower zippering strength value A may result in a more regular zippered mesh. However, lower zippering strength values A may require a greater number of iterations for the mesh boundaries 610 to converge. An exemplary formula for calculating the third position V' is provided in Equation 2, below. At step 935, the mesh zippering engine 155 moves the first vertex 620 to the third position.

$$V'=V+A(U-V) \qquad \text{(Eq. 2)}$$

At step 940, one or more mesh refinement passes (e.g., edge operations, vertex operations, and/or smoothing operations) may be performed on edges and/or vertices proximate to the first vertex 620 and/or second vertex 620 using the mesh refinement engine 150. At step 950, the mesh zippering engine 155 determines whether to move an additional vertex. If the mesh zippering engine 155 determines that an additional vertex should be moved, then the zippering operation is repeated beginning at step 920. Finally, at step 960, the zippered vertices may be optionally welded to form a continuous mesh surface.

FIGS. 10A-10G illustrate zippering operations performed to combine and modify meshes 605, according to one embodiment of the present invention. As shown, the zippering and mesh refinement techniques described herein may be used to efficiently zipper vertices to form smooth transitions between complex 3D meshes. For example, as shown in FIGS. 10A-10D, two separate 3D meshes 605 may be positioned in proximity to one another and iteratively zippered together in three-dimensional space using a user-friendly brush tool 630. Additionally, as shown in FIGS. 10E-10G, a brush tool 630 may be used to zipper gaps and openings associated with a single 3D mesh 605.

FIGS. 11A-11E illustrate zippering operations performed to patch a mesh 605, according to one embodiment of the present invention. As shown in FIG. 11A, a mesh patch 606 may be positioned near the mesh boundary 610 to be patched. The user may then operate a brush tool 630 to select the mesh boundaries along which the 3D mesh 605 and mesh patch 606 are to be zippered, as shown in FIG. 11B. The patched 3D mesh 605 is shown in FIG. 11C. Similarly, FIGS. 110 and 11E illustrate a zippering operation performed on a 3D mesh 605 and along selected boundaries of a mesh patch 606. In contrast to FIGS. 11A-11C, the mesh patch 606 shown in FIGS. 11D and 11E has been zippered only along the boundaries associated with the top and bottom edges of the mesh patch 606.

FIGS. 12A-12D illustrate zippering meshes 605 by issuing a zippering command on selected mesh boundaries 1310, according to one embodiment of the present invention. As shown, the user may select mesh boundaries 1310 (e.g., 1310-1 and 1310-2) to be zippered by the mesh zippering engine 155. The user may then issue a zippering command to the mesh zippering engine 155. Upon receiving a zippering command, the mesh zippering engine 155 and mesh refinement engine 150 may perform one or more zippering and mesh refinement iterations to zipper the 3D meshes. A zippering command may be issued on continuous spans of selected mesh boundaries 1310 (e.g., mesh boundaries 1310-1 and 1310-2) or a zippering command may be issued on partial spans of selected mesh boundaries 1310 (e.g., the partial spans associated with the parallel edges of mesh boundaries 1310-3 and 1310-4).

In sum, a mesh zippering engine receives a first design mesh boundary that is to be merged with a second design mesh boundary. A vertex on the first boundary that is nearest to a vertex on the second boundary is then identified, and the vertices are pulled together. As the vertices on the first boundary and second boundary are pulled closer together, mesh distortions and irregularities generated during the zippering process may be repaired by performing one or more edge operator passes, tip-collapse passes, and/or smoothing passes using a mesh refinement engine.

One advantage of the techniques described herein is that a user is able to merge mesh surface boundaries in a manner that does not result in significant mesh distortions or irregularities. The zippering algorithm may be applied in an iterative manner (e.g., with a brush tool) to move vertices associated with one boundary towards vertices associated with another boundary, while at the same time refining mesh distortions and irregularities generated by the zippering process. The disclosed technique, among other things, enables design meshes having different triangle and vertex densities to be efficiently merged with relatively little pre-processing workload.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for zippering meshes of primitives, the method comprising:
   identifying a first vertex associated with a first mesh boundary and having a first position;
   identifying a second vertex that is proximate to the first vertex and associated with a second mesh boundary, wherein the second vertex has a second position;
   determining a third position based on the first position, the second position, and a zippering strength factor, wherein:
      the third position is located in a region between the first position and the second position, and
      a first distance between the first position and the third position is based on the zippering strength factor and on a second distance between the first position and the second position; and
   moving the first vertex to the third position.

2. The method of claim 1, wherein determining the third position comprises multiplying a second distance between the first position and the second position by the zippering strength factor.

3. The method of claim 1, wherein identifying the first vertex and identifying the second vertex are performed by:
   receiving first user input associated with a brush tool position;
   receiving second user input associated with a brush tool radius; and
   determining that the first vertex and the second vertex are within a circular region defined by the brush tool radius and the brush tool position.

4. The method of claim 1, further comprising performing an edge collapse pass on a plurality of triangle edges associated with the first mesh boundary and the second mesh boundary, wherein the triangle edges are proximate to both the first vertex and the second vertex.

5. The method of claim 4, further comprising performing an edge split pass on the plurality of triangles.

6. The method of claim 5, wherein an edge collapse threshold value associated with the edge collapse pass divided by an edge split threshold value associated with the edge split pass is between approximately 0.4 and 0.6.

7. The method of claim 5, further comprising performing a smoothing pass on vertices associated with the triangle edges.

8. The method of claim 1, further comprising combining the first vertex and the second vertex into a welded vertex.

9. The method of claim 1, wherein identifying the second vertex comprises determining that the second vertex is a nearest vertex to the first vertex.

10. A non-transitory computer-readable storage medium including instructions that, when executed by a processing unit, cause the processing unit to zipper meshes of primitives, by performing the steps of:
   identifying a first vertex associated with a first mesh boundary and having a first position;
   identifying a second vertex that is proximate to the first vertex and associated with a second mesh boundary, wherein the second vertex has a second position;
   determining a third position based on the first position, the second position, and a zippering strength factor, wherein:
      the third position is located in a region between the first position and the second position, and
      a first distance between the first position and the third position is based on the zippering strength factor and on a second distance between the first position and the second position; and
   moving the first vertex to the third position.

11. The non-transitory computer-readable storage medium of claim 10, wherein determining the third position comprises multiplying a second distance between the first position and the second position by the zippering strength factor.

12. The non-transitory computer-readable storage medium of claim 10, wherein identifying the first vertex and identifying the second vertex are performed by:
   receiving first user input associated with a brush tool position;

receiving second user input associated with a brush tool radius; and determining that the first vertex and the second vertex are within a circular region defined by the brush tool radius and the brush tool position.

13. The non-transitory computer-readable storage medium of claim 10, further comprising performing an edge collapse pass on a plurality of triangle edges associated with the first mesh boundary and the second mesh boundary, wherein the triangle edges are proximate to both the first vertex and the second vertex.

14. The non-transitory computer-readable storage medium of claim 13, further comprising performing an edge split pass on the plurality of triangles.

15. The non-transitory computer-readable storage medium of claim 14, wherein an edge collapse threshold value associated with the edge collapse pass divided by an edge split threshold value associated with the edge split pass is between approximately 0.4 and 0.6.

16. The non-transitory computer-readable storage medium of claim 14, further comprising performing a smoothing pass on vertices associated with the triangle edges.

17. The non-transitory computer-readable storage medium of claim 10, further comprising combining the first vertex and the second vertex into a welded vertex.

18. The non-transitory computer-readable storage medium of claim 10, wherein identifying the second vertex comprises determining that the second vertex is a nearest vertex to the first vertex.

19. A computing device, comprising:
a memory; and
a processing unit coupled to the memory and configured to zipper meshes of primitives by:
identifying a first vertex associated with a first mesh boundary and having a first position;
identifying a second vertex that is proximate to the first vertex and associated with a second mesh boundary, wherein the second vertex has a second position;
determining a third position based on the first position, the second position, and a zippering strength factor, wherein:
the third position is located in a region between the first position and the second position, and
a first distance between the first position and the third position is based on the zippering strength factor and on a second distance between the first position and the second position; and
moving the first vertex to the third position.

20. The computing device of claim 19, wherein determining the third position comprises multiplying a second distance between the first position and the second position by the zippering strength factor.

21. The non-transitory computer-readable storage medium of claim 10, wherein, after moving the first vertex to the third position, the second vertex is located at the second position.

22. The non-transitory computer-readable storage medium of claim 10, further comprising:
determining a fourth position based the third position, the second position, and the zippering strength factor, wherein the fourth position is located in a region between the third position and the second position; and
moving the second vertex to the fourth position.

23. A method of claim 1, further comprising:
determining that a first vertex density of the first mesh boundary is different from a second vertex density of the second mesh boundary; and
blending the first vertex density of the first mesh boundary toward the second vertex density of the second mesh boundary.

24. A method if claim 1, wherein blending the first vertex density of the first mesh boundary toward the second vertex density of the second mesh boundary comprises blending the first vertex density of the first mesh boundary based on a mesh refinement parameter.

* * * * *